(12) United States Patent
Keppler et al.

(10) Patent No.: US 11,230,176 B2
(45) Date of Patent: Jan. 25, 2022

(54) BATTERY SYSTEM FOR USE ON A VEHICLE ELECTRICAL SYSTEM OF A MOTOR VEHICLE

(71) Applicant: Robert Bosch GmbH, Stuttgart (DE)

(72) Inventors: Bjoern Keppler, Waldbronn (DE); Klaus-Juergen Schuler, Leingarten (DE); Manuel Bark, Woerth (DE); Mehmet Inan, Untergruppenbach (DE); Ronny Groschke, Mutterstadt (DE); Ulrich Schuetterle, Neckarsulm (DE); Fabian Hauser, Loewenstein (DE)

(73) Assignee: Robert Bosch GmbH, Stuttgart (DE)

( * ) Notice: Subject to any disclaimer, the term of this patent is extended or adjusted under 35 U.S.C. 154(b) by 302 days.

(21) Appl. No.: 16/680,797

(22) Filed: Nov. 12, 2019

(65) Prior Publication Data

US 2020/0148051 A1 May 14, 2020

(30) Foreign Application Priority Data

Nov. 13, 2018 (DE) .................... 10 2018 219 320.7

(51) Int. Cl.
*B60K 1/04* (2019.01)
*H01M 50/20* (2021.01)
*B60R 16/033* (2006.01)
*H01M 10/42* (2006.01)

(52) U.S. Cl.
CPC ............ *B60K 1/04* (2013.01); *B60R 16/033* (2013.01); *H01M 50/20* (2021.01); *H01M 2010/4271* (2013.01); *H01M 2220/20* (2013.01)

(58) Field of Classification Search
CPC .......... B60L 50/64; B60L 50/66; B60K 1/04; H01M 50/20; H01M 2220/20
See application file for complete search history.

(56) References Cited

U.S. PATENT DOCUMENTS

| 3,634,724 A | | 1/1972 | Vest |
| 5,159,257 A | * | 10/1992 | Oka ..................... H02J 7/0031 |
| | | | 307/10.7 |
| 5,729,192 A | | 3/1998 | Badger |

(Continued)

FOREIGN PATENT DOCUMENTS

| DE | 69425795 | 4/2001 |
| DE | 102011013182 | 9/2012 |

(Continued)

*Primary Examiner* — Jonathan Ng
*Assistant Examiner* — James J Triggs
(74) *Attorney, Agent, or Firm* — Michael Best & Friedrich LLP

(57) ABSTRACT

A battery system (10) for use on a vehicle electrical system (50) of a motor vehicle, comprising a negative pole (21), a positive pole (22), a battery module (5) and a switching unit (60) that has at least one actuatable switch and a current sensor (65) for measuring a battery current (IB) flowing through the battery system (10) is disclosed. The switching unit (60) is operable in a safety mode in which the at least one switch and the current sensor (65) interact such that the battery current (IB) is limited to a prescribed maximum value or is interrupted for a prescribed maximum period of time if the battery current (IB) exceeds a prescribed limit value and hence starting of the motor vehicle is prevented.

9 Claims, 3 Drawing Sheets

(56) References Cited

U.S. PATENT DOCUMENTS

| | | | | |
|---|---|---|---|---|
| 7,254,811 | B2* | 8/2007 | Kouznetsov | H04W 12/128 |
| | | | | 717/173 |
| 7,508,091 | B2* | 3/2009 | Binder | H02J 7/0031 |
| | | | | 307/10.7 |
| 7,911,080 | B2* | 3/2011 | Turski | H02J 7/0048 |
| | | | | 307/10.7 |
| 9,008,907 | B2* | 4/2015 | Copeland | B60R 16/03 |
| | | | | 701/36 |
| 2007/0155150 | A1* | 7/2007 | Kim | H01L 27/10855 |
| | | | | 438/597 |
| 2020/0148051 | A1* | 5/2020 | Keppler | H01M 10/48 |

FOREIGN PATENT DOCUMENTS

| | | |
|---|---|---|
| DE | 102016223734 | 5/2018 |
| EP | 0161365 | 11/1985 |
| WO | 9915378 | 4/1999 |

* cited by examiner

BATTERY SYSTEM FOR USE ON A VEHICLE ELECTRICAL SYSTEM OF A MOTOR VEHICLE

BACKGROUND OF THE INVENTION

The invention relates to a battery system for use on a vehicle electrical system of a motor vehicle, comprising a negative pole, a positive pole, a battery module and a switching unit that has at least one actuatable switch and a current sensor for measuring a battery current flowing through the battery system.

Conventional motor vehicles have a drive, which usually comprises an internal combustion engine. Further, conventional motor vehicles comprise a battery system for supplying electrical power to a starter and to further loads on a vehicle electrical system of the motor vehicle, and also a generator for charging the battery system. A battery system of the type in question comprises at least one battery module and a switching unit by means of which the battery module can be connected and disconnected. The battery module in this instance has multiple battery cells, for example having lithium-ion cells. Further, there is provision for a management system for controlling and monitoring the battery cells of the battery module.

High-end motor vehicles, in particular, are stolen relatively frequently. Modern motor vehicles are therefore regularly equipped with theft-prevention apparatuses that are supposed to prevent or at least hamper theft of the vehicle. Theft-prevention apparatuses for retrofitting in motor vehicles are also known.

The document EP 0 161 365 A2 discloses a theft-prevention apparatus for a vehicle that has a switch by means of which the battery is isolable from the vehicle. The battery is isolated from the vehicle in particular when a current through the battery cable exceeds a prescribed limit value. The prescribed limit value in this instance corresponds to a starting current requirement of a starter, which is not sufficient for starting the vehicle just now. The theft-prevention apparatus is activatable and deactivatable by means of a remote control.

The document DE 10 2016 223 734 A1 discloses a vehicle having a hydraulic braking system, wherein the braking system is incorporated in a theft-prevention system. In a go operating state, the braking system is clear in this instance, and movement of the wheels of the vehicle is possible. In a no-go operating state, the braking system locks, and movement of the wheels is prevented. To control the state, there is provision for a control unit. An authentication unit, which is a Bluetooth unit, for example, can be used to reverse locking of the braking system by means of an appropriate radio signal. The theft-prevention system is activated, in particular automatically, if the vehicle has not been moved for a prescribed period of time, for example 10 minutes.

The document DE 10 2011 013 182 A1 discloses a safety battery for electric vehicles. In this case, the battery cells of the battery are interconnected in groups. The battery cells groups are connected to one another via multiple switchable isolating elements. A control command can be used to isolate the battery cell groups from one another. Appropriate radio signals can be used to disengage the traction battery. The motor vehicle drive is therefore locked. The theft-prevention apparatus formed in this manner can be activated and deactivated by means of wireless communication devices, for example mobile phone, in particular on a Bluetooth basis.

From use, theft-prevention apparatuses for motor vehicles are furthermore known that use a switch to isolate the battery from the vehicle electrical system of the motor vehicle. Such theft-prevention apparatuses are activatable and deactivatable via radio signals, for example from a mobile telephone.

SUMMARY OF THE INVENTION

A battery system for use on a vehicle electrical system of a motor vehicle is proposed. The battery system comprises a negative pole, a positive pole and a battery module. The battery module has multiple battery cells that can be connected up to one another within the battery module either in series or in parallel.

The battery module further comprises a negative terminal and a positive terminal. The negative terminal and the positive terminal have a voltage applied between them that is delivered by the battery cells of the battery module. In a normal mode of the battery system, the voltage delivered by the battery module is also applied between the negative pole and the positive pole as an output voltage.

The battery system further comprises a switching unit that has at least one actuatable switch and a current sensor for measuring a battery current flowing through the battery system. The switch is for example a semiconductor switch, in particular a MOSFET transistor. The switch can for example also be an actuatable relay, however. The battery current in this instance flows in particular through the negative pole and/or through the positive pole of the battery system.

According to the invention, the switching unit is operable in a safety mode in which the at least one switch and the current sensor interact such that the battery current is limited to a prescribed maximum value, or the battery current is interrupted for a prescribed maximum period of time, if the battery current exceeds a prescribed limit value.

If the switching unit is operated in the safety mode, then theft of the motor vehicle is substantially hampered. In particular, starting of an internal combustion engine of the motor vehicle by means of a starter of the motor vehicle is prevented. The switching unit is also operable in a driving mode in which the internal combustion engine of the motor vehicle can be started by means of the starter.

The prescribed limit value is below a starting current that is needed by the starter of the motor vehicle in order to start the internal combustion engine. The prescribed limit value is in an order of magnitude of between 400 A and 700 A, for example.

Preferably, the battery current is limited or interrupted immediately, that is to say without delay, as soon as the current sensor measures a battery current that exceeds the prescribed limit value. Alternatively, it is conceivable for the battery current to be limited or interrupted only when the current sensor measures a battery current exceeding the prescribed limit value for a time of 50 ms or 100 ms, for example.

The prescribed maximum value corresponds to a current that is smaller than the starting current that the starter of the motor vehicle needs in order to start the internal combustion engine. The limitation of the battery current to the maximum value therefore prevents the internal combustion engine from being started by the starter.

A temporary interruption in the battery current can occur as a result of a temporary disconnection of the output voltage delivered by the battery system from the vehicle electrical system. The prescribed maximum period of time in this instance is preferably shorter than a time during which other loads connected to the vehicle electrical system of the motor vehicle, for example controllers, can remain switched on without an external power supply. The temporary interruption of the battery current thus does not switch off said loads.

In accordance with one advantageous configuration of the invention, the switching unit has a first switch through which the battery current flows if the first switch is closed. The first switch is actuatable, by virtue of the first switch being opened, such that the battery current is interrupted for a prescribed length of time that is less than or equal to the maximum period of time. If the first switch is open, then the output voltage is also disconnected.

After the prescribed length of time, the first switch is preferably closed again in order to ensure that power is supplied to other loads, for example controllers, again. It is also conceivable for the first switch to be operated in clocked fashion. This means that the first switch is repeatedly opened and closed over a prescribed length of time that is less than or equal to the maximum period of time.

In accordance with another advantageous configuration of the invention, the switching unit has a second switch that is electrically connected in parallel with a limiting resistor. The switching unit is configured such that the battery current flows through the limiting resistor when the second switch is open. The battery current produces a voltage drop across the limiting resistor in this instance. As a result, the output voltage of the battery system falls, and this limits the battery current.

In accordance with a further advantageous configuration of the invention, the switching unit has a third switch that is electrically connected in series with a heating resistor. The heating resistor is used in particular for heating the battery cells of the battery module at low temperature. The switching unit is configured such that a heating current flows through the heating resistor when the third switch is closed. The heating current produces a voltage drop across the heating resistor and also across an internal resistance of the battery module in this instance. As a result, the output voltage of the battery system falls, and this limits the battery current.

In accordance with one advantageous development of the invention, the battery system comprises a supplementary pole that is electrically connected to the battery module by bypassing the switching unit. When used in the motor vehicle, the positive pole of the battery system is then preferably electrically connected to the starter, while the supplementary pole is electrically connected to the other connected loads, for example controllers. In this case, interruption or limiting of the battery current by means of the switching unit has reduced effects on the supply of power to the other connected loads, for example controllers.

In accordance with one advantageous development of the invention, the battery system comprises at least one further switch. Individual battery cells of the battery module are disconnectable by means of the at least one further switch. If for example the battery cells within the battery module are connected up in series, then the at least one further switch can be used to bypass and avoid individual battery cells. This lowers the voltage delivered by the battery module and the output voltage of the battery system accordingly. This lowers the current deliverable by the battery module below the necessary limit value for starting the vehicle via the starter.

Advantageously, the switching unit has a control unit by means of which the switching unit is switchable to the safety mode and to the driving mode, in which the internal combustion engine of the motor vehicle can be started by means of the starter. In the driving mode, there is in particular no provision for limiting or interruption of the battery current if the battery current exceeds the prescribed limit value. To this end, the control unit comprises a microcontroller, for example.

Preferably, the switching unit has a communication unit. At least one control signal for switching the switching unit to the safety mode and to the driving mode is receivable and transmittable to the control unit via the communication unit.

The communication unit is preferably embodied as a wireless radio interface, for example WLAN or Bluetooth. Advantageously, the at least one control signal for switching the switching unit can be sent by a mobile telephone in this instance.

In accordance with one possible configuration of the invention, the control unit switches the switching unit to the driving mode if and while the communication unit receives a control signal. The control unit switches the switching unit to the safety mode if the communication unit does not receive an applicable control signal for a prescribed period. By way of example, a mobile telephone of the owner of the motor vehicle sends the control signal at periodic intervals of time. If the owner is close to the motor vehicle with the mobile telephone, then the communication unit receives the control signal and the switching unit is switched to the driving mode. If the owner moves away from the motor vehicle with the mobile telephone, then the communication unit no longer receives the control signal, and the switching unit is automatically switched to the safety mode.

A battery system according to the invention is advantageously used on a vehicle electrical system of a motor vehicle, in particular a motor vehicle having an internal combustion engine. Alternatively, other uses of the battery system include, for example on vehicle electrical systems of other motor vehicles such as, for example, hybrid vehicles and plug-in hybrid vehicles, which start an internal combustion engine via a battery system.

A battery system according to the invention in a motor vehicle allows theft of the motor vehicle to be substantially hampered. Said limitation and/or interruption of the battery current reliably prevents the internal combustion engine of the motor vehicle from being started by the starter of the motor vehicle. The battery system according to the invention in a motor vehicle in this instance additionally allows other loads connected to the vehicle electrical system of the motor vehicle, for example controllers, to remain switched on. Said limitation and/or interruption of the battery current thus does not switch off said loads. It is therefore possible for fundamental standards for the automotive industry, in particular ASIL requirements in accordance with ISO 26262, to be complied with. The battery system according to the invention can be operated particularly conveniently by a user of the motor vehicle in this instance by means of a mobile telephone, for example. Additionally, the battery system according to the invention can also automatically be switched to the safety mode, in which theft prevention is activated, and the driving mode, in which theft prevention is deactivated, by means of a mobile telephone, for example.

BRIEF DESCRIPTION OF THE DRAWINGS

Embodiments of the invention are explained in more detail on the basis of the drawings and the description below.

In the drawings.

DETAILED DESCRIPTION

In the description of the embodiments of the invention below, identical or similar elements are denoted by the same reference signs, these elements not being described repeatedly in individual cases. The figures show the subject matter of the invention only schematically.

Figure 1:
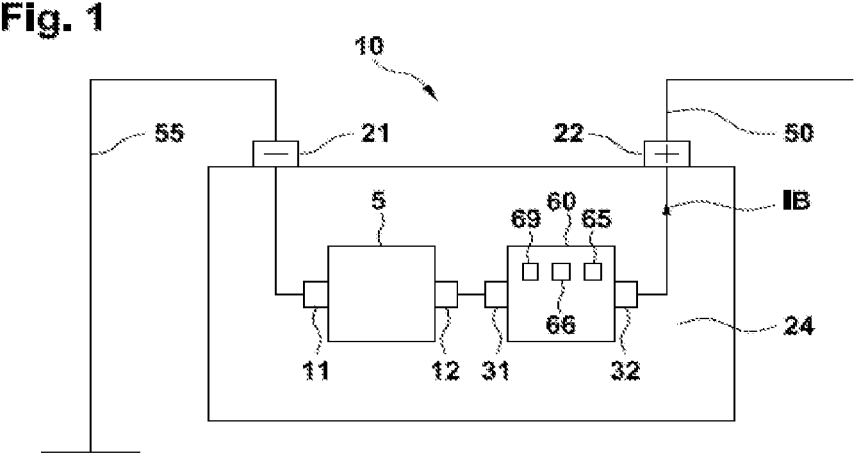
FIG. 1 shows a schematic depiction of a battery system on a vehicle electrical system of a motor vehicle.

FIG. 1 shows a schematic depiction of a battery system 10 on a vehicle electrical system 50 of a motor vehicle, which is not depicted in the present case. In this connection, the live supply lines in the motor vehicle are referred to as the vehicle electrical system 50. In the present case, the vehicle electrical system 50 has a nominal voltage of 12 volts referenced to a ground line 55 in the motor vehicle. The vehicle electrical system 50 can also have a different nominal voltage, for example 24 volts or 48 volts. The vehicle electrical system 50 has a starter, not depicted in the present case, connected to it, inter alia, for starting an internal combustion engine of the motor vehicle.

The battery system 10 comprises a positive pole 22 connected to the vehicle electrical system 50. The battery system 10 also comprises a negative pole 21 connected to the ground line 55. The battery system 10 comprises a battery module 5 that has multiple battery cells, which are embodied as lithium-ion cells, for example. The battery cells are connected in series, for example, and deliver a nominal voltage of 12 volts, for example. The battery module 5 has a negative terminal 11 and a positive terminal 12. The terminals 11, 12 of the battery module 5 have the nominal voltage of 12 volts that is delivered by said battery cells applied between them.

The battery module 5 is arranged in a housing 24. The negative pole 21 and the positive pole 22 protrude from the housing 24. The negative terminal 11 is electrically connected to the negative pole 21. In a normal mode, if the positive terminal 12 is electrically connected to the positive pole 22, then the poles 21, 22 likewise have the nominal voltage of 12 volts that is delivered by the battery cells of the battery module 5 applied between them as output voltage.

The battery system 10 further comprises a switching unit 60. The switching unit 60 has a first connection 31, which is electrically connected to the positive terminal 12. The switching unit 60 also has a second connection 32, which is electrically connected to the positive pole 22. The switching unit 60 is likewise located in the housing 24 in the present case. In a normal mode, the first connection 31 has the nominal voltage of for example 12 volts that is delivered by the battery module 5 applied to it.

The switching unit 60 comprises a current sensor 65 for measuring a battery current IB flowing through the battery system 10. In this instance, the battery current IB flows in particular through the negative pole 21 and/or through the positive pole 22 of the battery system 10.

The switching unit 60 comprises a control unit 66 by means of which the switching unit 60 is switchable to a safety mode and to a driving mode. To this end, the control unit 66 comprises a microcontroller, for example. In the driving mode, the internal combustion engine of the motor vehicle can be started by means of the starter. In the safety mode, starting of the internal combustion engine by means of the starter is prevented.

The switching unit 60 comprises a communication unit 69. In a present case, the communication unit 69 is embodied as a wireless radio interface, for example WLAN or Bluetooth. At least one control signal for switching the signal unit 60 to the safety mode and to the driving mode is receivable and transmittable to the control unit 66 via the communication unit 69.

Figure 2:
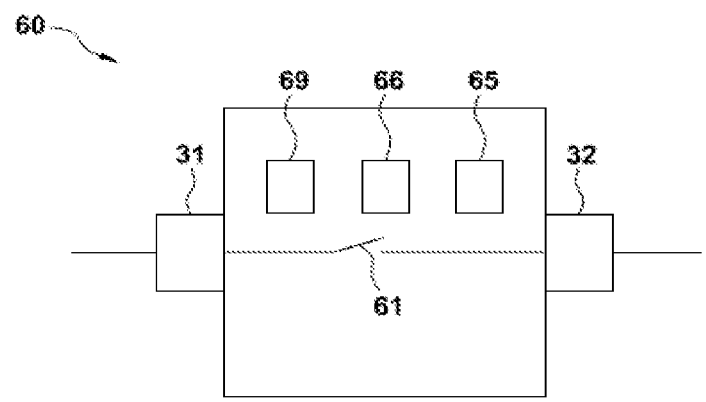
FIG. 2 shows a schematic depiction of a switching unit in accordance with a first embodiment.

FIG. 2 shows a schematic depiction of a switching unit 60 in accordance with a first embodiment. The switching unit 60 has a first switch 61, which is electrically connected to the first connection 31 and to the second connection 32. The battery current IB flows through the first switch 61 if the first switch 61 is closed. If the first switch 61 is open, then the electrical connection between the positive pole 22 and the positive terminal 12 is broken, and hence the output voltage is disconnected.

Figure 3:
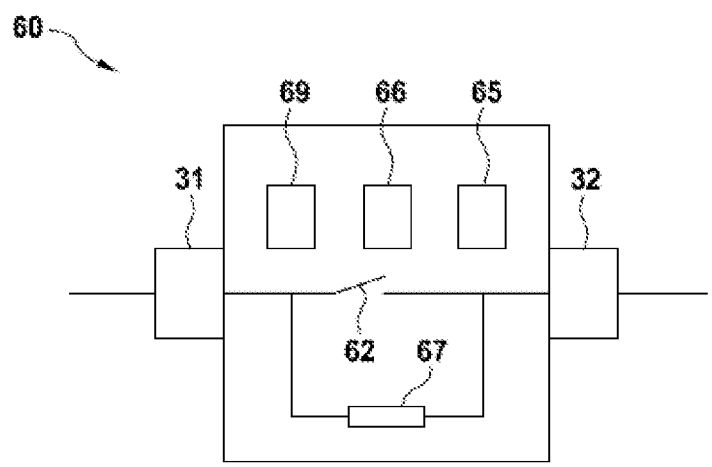
FIG. 3 shows a schematic depiction of a switching unit in accordance with a second embodiment.

FIG. 3 shows a schematic depiction of a switching unit 60 in accordance with a second embodiment. The switching unit 60 has a second switch 62 and a limiting resistor 67. The second switch 62 is electrically connected to the first connection 31 and to the second connection 32. The limiting resistor 67 is electrically connected in parallel with the second switch 62. The battery current IB flows through the second switch 62 if the second switch 62 is closed. If the second switch 62 is open, then the battery current IB flows through the limiting resistor 67 and in so doing produces a voltage drop across the limiting resistor 67. As a result, the output voltage of the battery system 10 falls.

Figure 4:
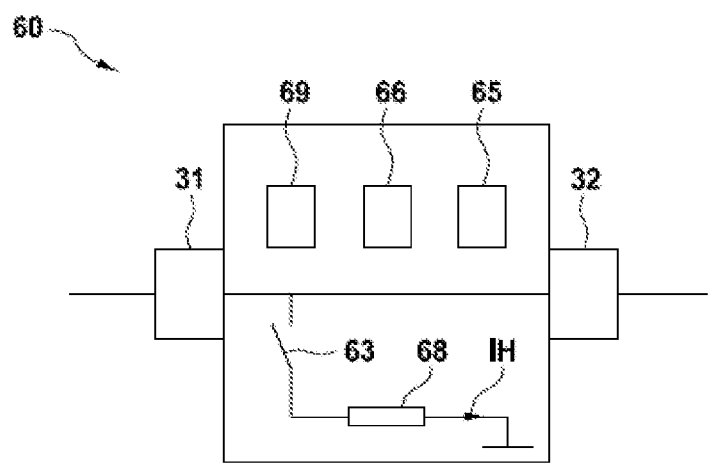
FIG. 4 shows a schematic depiction of a switching unit in accordance with a third embodiment.

FIG. 4 shows a schematic depiction of a switching unit 60 in accordance with a third embodiment. The first connection 31 is electrically connected directly to the second connection 32 by means of a connecting line. The switching unit 60 has a third switch 63 and a heating resistor 68. The third switch 63 is electrically connected to the connecting line and connected in series with the heating resistor 68. The heating resistor 68 is connected to ground via the negative pole 21, not depicted in the present case, and is used in particular to heat the battery cells of the battery module 5 at low temperature.

If the third switch 63 is closed, then a heating current IH flows through the third switch 63 and through the heating resistor 68. In so doing, the heating current IH produces a voltage drop across the heating resistor 68 and across an internal resistance, not depicted in the present case, of the battery module 5. As a result, the output voltage of the battery system 10 falls.

Figure 5:
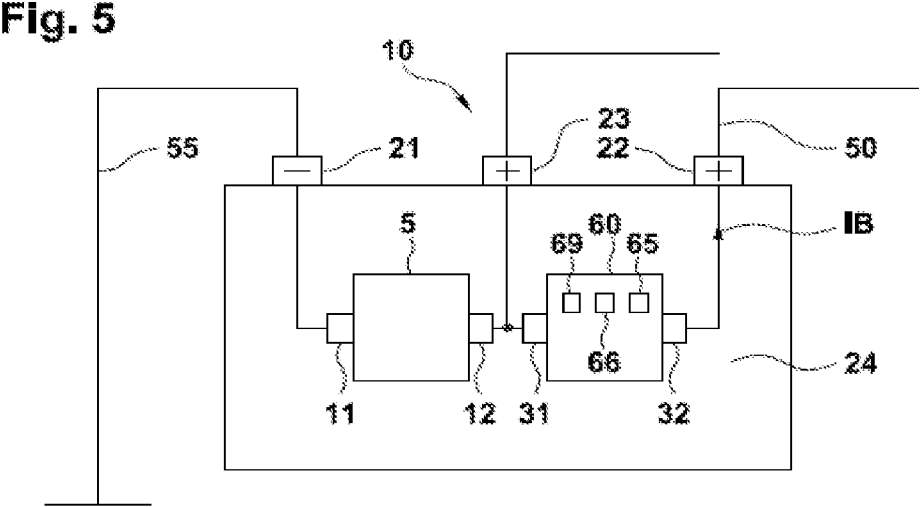
FIG. 5 shows a schematic depiction of a battery system in accordance with an alternative embodiment on a vehicle electrical system of a motor vehicle.

FIG. 5 shows a schematic depiction of a battery system 10 in accordance with an alternative embodiment on a vehicle electrical system 50 of a motor vehicle. The battery system 10 in accordance with the alternative embodiment is of largely the same type of design as the battery system 10 depicted in FIG. 1. The differences are discussed below.

The battery system 10 in accordance with the alternative embodiment comprises a supplementary pole 23 that protrudes from the housing 24. The supplementary pole 23 is electrically connected to the positive terminal 12. The supplementary pole 23 is thus electrically connected to the battery module 5 by bypassing the switching unit 60. In a normal mode, the supplementary pole 23 and the negative pole 21 likewise have the nominal voltage of for example 12 volts, that is delivered by the battery cells of the battery module 5 applied between them. In the motor vehicle, the positive pole 22 is electrically connected to the starter. The supplementary pole 23 is electrically connected to the other connected loads, for example controllers.

Figure 6:
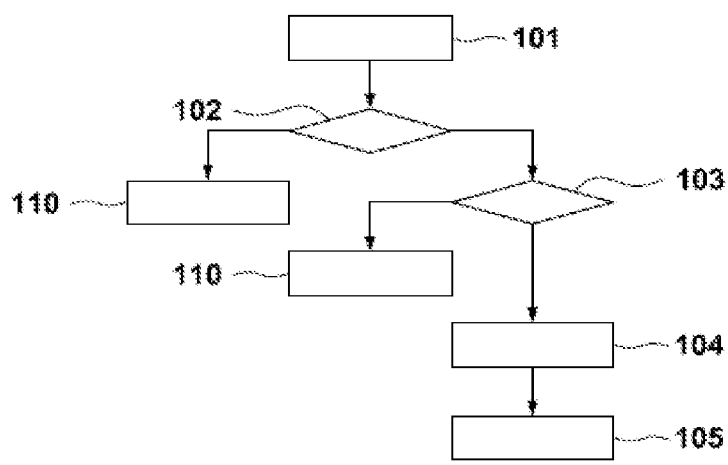
FIG. 6 shows a schematic depiction of a method for operating a battery system on a vehicle electrical system of a motor vehicle.

FIG. 6 shows a schematic depiction of a method for operating a battery system 10 on a vehicle electrical system 50 of a motor vehicle. In a starting step 101, the motor vehicle is parked and the internal combustion engine is switched off in the process.

Subsequently, a next step 102 involves checking whether the switching unit 60 is switched to the driving mode, in which the internal combustion engine in the motor vehicle can be started by means of the starter, or whether the switching unit 60 is switched to the safety mode, in which starting of the internal combustion engine by means of the starter is prevented. If the switching unit 60 is switched to the driving mode, then the method is terminated in an end step 110.

If the switching unit 60 is switched to the safety mode, then a next step 103 involves the battery current IB being measured and monitored by means of the current sensor 65. If the battery current IB is below a prescribed limit value or is equal to the prescribed limit value, then the method is terminated in a further end step 110.

If the battery current IB exceeds the prescribed limit value, then the battery current IB is limited to a prescribed maximum value or interrupted for a prescribed maximum period of time in a next step 104. This prevents starting of the internal combustion engine in the motor vehicle by means of the starter.

In a next step 105, the owner of the motor vehicle is informed that an attempt has been made to start the internal combustion engine of the motor vehicle by means of the starter while the switching unit 60 was switched to the safety mode. Said information is sent for example from the communication unit 69 of the battery system 10 to a mobile telephone of the owner of the motor vehicle. Said information can also be indicated in the cockpit of the motor vehicle.

The invention is not restricted to the exemplary embodiments described herein and the aspects highlighted therein. On the contrary, a large number of variations that are within the scope of action of a person skilled in the art are possible within the scope indicated by the claims.

The invention claimed is:

1. A battery system (10) for use on a vehicle electrical system (50) of a motor vehicle, the battery system comprising:
a negative pole (21), a positive pole (22), a battery module (5) and a switching unit (60) that has at least one actuatable switch (61, 62, 63) and a current sensor (65) for measuring a battery current (IB) flowing through the battery system (10),
wherein
the switching unit (60) is operable in a safety mode in which the at least one switch (61, 62, 63) and the current sensor (65) interact such that
the battery current (IB)
is limited to a prescribed maximum value or
is interrupted for a prescribed maximum period of time
if the battery current (IB) exceeds a prescribed limit value.

2. The battery system (10) according to claim 1, wherein the switching unit (60) has a first switch (61) through which the battery current (IB) flows and that is actuatable such that the battery current (IB) is interrupted for a prescribed length of time that is less than or equal to the maximum period of time.

3. The battery system (10) according to claim 1, wherein the switching unit (60) has a second switch (62) that is electrically connected in parallel with a limiting resistor (67), so that the battery current (IB) flows through the limiting resistor (67) when the second switch (62) is open.

4. The battery system (10) according to claim 1, wherein the switching unit (60) has a third switch (63) that is electrically connected in series with a heating resistor (68), so that a heating current (IH) flows through the heating resistor (68) when the third switch (63) is closed.

5. The battery system (10) according to claim 1, wherein the battery system (10) comprises a supplementary pole (23) that is electrically connected to the battery module (5) by bypassing the switching unit (60).

6. The battery system (10) according to claim 1, wherein the switching unit (60) has a control unit (66) by means of which the switching unit (60) is switchable to a safety mode and to a driving mode, in which there is no provision for limiting or interruption of the battery current (IB) if the battery current (IB) exceeds the prescribed limit value.

7. The battery system (10) according to claim 6, wherein the switching unit (60) has a communication unit (69) via which at least one control signal for switching the switching unit (60) to the safety mode and to the driving mode is receivable and transmittable to the control unit (66).

8. The battery system (10) according to claim 7, wherein the communication unit (69) is embodied as a wireless radio interface.

9. The battery system (10) according to claim 7, wherein the control unit (66) switches the switching unit (60) to the driving mode if the communication unit (69) receives a control signal, and in that the control unit (66) switches the switching unit (60) to the safety mode if the communication unit (69) does not receive a control signal for a prescribed period.

* * * * *